United States Patent
Sakai et al.

(10) Patent No.: US 12,188,136 B2
(45) Date of Patent: Jan. 7, 2025

(54) HYPOCHLOROUS ACID GENERATING ELECTRODE

(71) Applicant: TOTO LTD., Kitakyushu (JP)

(72) Inventors: Sena Sakai, Kitakyushu (JP); Keisuke Tashiro, Kitakyushu (JP); Satoru Matsumoto, Kitakyushu (JP); Hiroaki Amemori, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 18/119,993

(22) Filed: Mar. 10, 2023

(65) Prior Publication Data

US 2023/0357938 A1   Nov. 9, 2023

(30) Foreign Application Priority Data

Mar. 31, 2022 (JP) ................................ 2022-059482

(51) Int. Cl.
| | |
|---|---|
| C25B 11/00 | (2021.01) |
| C25B 1/22 | (2006.01) |
| C25B 9/17 | (2021.01) |
| C25B 11/063 | (2021.01) |
| C25B 11/075 | (2021.01) |

(52) U.S. Cl.
CPC .............. *C25B 11/075* (2021.01); *C25B 1/22* (2013.01); *C25B 9/17* (2021.01); *C25B 11/063* (2021.01)

(58) Field of Classification Search
CPC ....... C25B 11/075; C25B 9/17; C25B 11/063; C25B 1/22
See application file for complete search history.

(56) References Cited

U.S. PATENT DOCUMENTS

| | | | |
|---|---|---|---|
| 4,554,176 A | 11/1985 | Asano et al. | |
| 5,954,939 A | 9/1999 | Kanekuni et al. | |
| 2004/0188247 A1 | 9/2004 | Hardee | |

FOREIGN PATENT DOCUMENTS

| | | |
|---|---|---|
| CN | 105967281 A | 9/2016 |
| CN | 106521404 A | 3/2017 |
| CN | 111663168 A | 9/2020 |
| EP | 1 486 459 A2 | 12/2004 |
| JP | S59-150091 A | 8/1984 |
| JP | H01-301876 A | 12/1989 |
| JP | H02-263989 A | 10/1990 |
| JP | H07-299465 A | 11/1995 |
| JP | H08-290168 A | 11/1996 |
| JP | 2006-515389 A | 5/2006 |
| JP | 2006-322026 A | 11/2006 |
| JP | 2008-050675 A | 3/2008 |
| JP | 2009-052069 A | 3/2009 |
| JP | 2013-142166 A | 7/2013 |
| JP | 2023-095833 A | 7/2023 |
| WO | 83/03265 A1 | 9/1983 |

OTHER PUBLICATIONS

Office Action mailed on Jul. 18, 2023 issued in the corresponding Japanese Patent Application No. 2022-059482.
The extended European search report dated Oct. 9, 2023 issued in the corresponding EP Patent Application No. 1 23163579.8.

*Primary Examiner* — Zulmariam Mendez
(74) *Attorney, Agent, or Firm* — Carrier, Shende & Associates P.C.; Joseph P. Carrier; Fulchand P. Shende

(57) ABSTRACT

Disclosed is a hypochlorous acid generating electrode that is substantially free from rhodium, which is comparable in performance to a rhodium-containing electrode and is more durable than the rhodium-containing electrode. The electrode to be used for generating hypochlorous acid by electrolyzing water that contains a chloride ion has excellent hypochlorous acid water generation ability and durability, in which the electrode has an electrode substrate comprising titanium or titanium alloy, and a composite layer that is electrically connected with the electrode substrate and that contains iridium or a compound thereof, tantalum or a compound thereof, and ruthenium or a compound thereof and/or platinum, and does not contain rhodium oxide.

8 Claims, No Drawings

HYPOCHLOROUS ACID GENERATING ELECTRODE

TECHNICAL FIELD

The present invention relates to an electrode for generating hypochlorous acid by electrolyzing water that contains a chloride ion, more specifically to an electrode for generating hypochlorous acid that can be used for sterilization and the like.

BACKGROUND ART

Electrolyzation of water that contains a chloride ion, e.g., tap water and well water, produces chlorine at an anode, and the chlorine with water produces hypochlorous acid water. Due to the germicide activity of hypochlorous acid, the hypochlorous acid water thereby generated is widely used in sterilization of bodies, foods, goods, and so on.

Various compositions for the electrode capable of generating hypochlorous acid water have been proposed with which hypochlorous acid can be efficiently generated even from water that is low in the chloride ion concentration, such as tap water.

For example, JP 2009-052069 A (PTL 1) proposes an electrode having an electrode catalyst layer of a complex of platinum, iridium oxide, rhodium oxide, and tantalum oxide formed on a conductive substrate formed of titanium or titanium alloy. JP 2013-142166 A (PTL 2) proposes an electrode having an electrode catalyst layer formed of a complex of platinum, iridium oxide, rhodium oxide, and tantalum oxide in which the composition thereof is different from PTL 1 is used. It is disclosed that these electrodes can efficiently generate hypochlorous acid water even from water that is relatively low in the chloride ion concentration.

Rhodium included in the electrodes that are disclosed in PTL 1 and PTL 2 is a so-called rare metal, which is low in the production amount; thus, this is a relatively expensive metal element.

CITATION LIST

Patent Literatures

[PTL 1] JP 2009-052069 A
[PTL 2] JP 2013-142166 A

SUMMARY OF INVENTION

Technical Problem

We have now found a composition for a hypochlorous acid generating electrode that is comparable in performance to a rhodium-containing electrode and is even more durable than the rhodium-containing electrode. The present invention is based on this finding.

Accordingly, an object of the present invention is to provide a hypochlorous acid generating electrode that is substantially free from rhodium oxide. In addition, an object of the present invention is to provide an apparatus of producing hypochlorous acid water, which comprises the electrode according to the present invention, and a method of producing hypochlorous acid water using the electrode according to the present invention.

Solution to Problem

An electrode according to the present invention for generating hypochlorous acid by electrolyzing water that contains a chloride ion, comprises an electrode substrate comprising titanium or titanium alloy, and
a composite layer that is electrically connected with the electrode substrate;

wherein the composite layer comprises iridium or a compound thereof, tantalum or a compound thereof, and ruthenium or a compound thereof and/or platinum, and does not contain rhodium oxide.

EMBODIMENTS OF THE INVENTION

Basic Structure of the Electrode

The electrode according to the present invention has the basic structure having at least an electrode substrate formed of titanium or titanium alloy and a composite layer that is electrically connected with the substrate. The electrode is characterized in that the composite layer that is connected with the substrate is formed of iridium or its compound, tantalum or its compound, and ruthenium or its compound and/or platinum, and the composite layer does not contain rhodium oxide.

In the present invention, "does not contain rhodium oxide" means that the presence of a trace amount of rhodium oxide or the presence thereof as an unavoidable component may be allowed, but rhodium oxide or its compound of which amount can have an influence on the characteristic of the electrode is not contained therein. In the present invention, for example, the presence of rhodium oxide of which amount is 1% or more by mole is not allowed. According to the present invention, when the composite layer has a composition containing iridium or its compound, tantalum or its compound, ruthenium or its compound, and platinum, and does not contain rhodium oxide, the electrode using this layer can have the ability of generating hypochlorous acid comparable to the conventional electrodes containing rhodium oxide (for example, those disclosed in PTL 1 or 2). Because rhodium is expensive, the replacement with ruthenium or platinum, which are less expensive than rhodium, can bring about a remarkable advantage in the production cost of the electrode.

According to a preferred embodiment of the present invention, examples of the iridium compound, the tantalum compound, and the ruthenium compound are the oxides of them and therefore the composite layer can be composed of preferably iridium oxide, tantalum oxide, ruthenium oxide, and platinum, without containing other elements or compounds of which amounts are beyond trace amounts or unavoidable amounts of them.

Electrode Substrate

In the present invention, the electrode substrate formed of titanium or titanium alloy is used. The titanium alloy that is a corrosion-resistant, conductive alloy formed of mainly titanium can be used. The titanium-based alloys that have been used as conventional electrode materials can be used, in which illustrative combination examples thereof include Ti—Ta—Nb, Ti—Pd, Ti—Zr, and Ti—Al. These electrode materials can be processed to an desired form such as a plate-like form, a porous plate form, a rod-like form, or a net-like plate form so as to be used as the electrode substrate. In the present invention, a titanium oxide film formed on the electrode substrate surface is not excluded.

Composite Layer

The electrode according to the present invention is characterized in that the electrode has a composite layer electrically connected with the electrode substrate described above, in which the composite layer contains, as described above, iridium or its compound, tantalum or its compound, ruthenium or its compound and/or platinum, and does not contain rhodium oxide. The composite layer of the electrode according to the present invention is characterized in that it does not contain rhodium oxide; so, the composition of the composite layer proposed by the present invention can also be understood as the composition in which rhodium contained in the conventionally known rhodium-containing electrode is replaced by ruthenium and/or platinum. Therefore, the composition of the composite layer of the electrode according to the present invention may be determined by replacing rhodium by ruthenium and/or platinum in the composition of a conventionally known or a to-be-proposed rhodium-containing electrode for generating hypochlorous acid.

According to a preferred embodiment of the present invention, as one composition of the composite layer, in terms of metal, the content of iridium can be preferably in the range of 30 to 80 mol %, while a more preferable lower limit thereof is 32 mol %; the upper limit thereof is more preferably 60 mol %, while still more preferably 43 mol %.

Also, the content of tantalum in terms of metal can be preferably in the range of 6 to 53 mol %, while a more preferable lower limit thereof is 22 mol %, still more preferably 25 mol %; the upper limit thereof is more preferably 60 mol %, while still more preferably 43 mol %.

Also, the content of ruthenium in terms of metal can be preferably in the range of 0 to 97 mol %, while a more preferable lower limit thereof is 7 mol %, still more preferably 8 mol %; the upper limit thereof is more preferably 22 mol %.

The content of platinum can be preferably in the range of 0 to 97 mol %, while a more preferable lower limit thereof is 7 mol %, still more preferably 10 mol %; the upper limit thereof is more preferably 23 mol %.

According to a more preferred embodiment of the present invention, one composition of the composite layer shall contain, in terms of metal, iridium in the range of 32 to 43 mol %, tantalum in the range of 25 to 36 mol %, ruthenium in the range of 8 to 22 mol %, and platinum in the range of 10 to 23 mol %.

Further, according to one embodiment of the present invention, it is preferable to contain ruthenium in the range of 11 to 19 mol % and platinum in the range of 13 to 20 mol %. According to another embodiment of the present invention, in terms of metal, the total of the ruthenium and the platinum is preferably in the range of 24 to 39 mol %. According to another embodiment, it is preferable to contain ruthenium and platinum in approximately the same ratio in terms of metal.

Use of the Electrode

The electrode according to the present invention is excellent in the ability to generate hypochlorous acid as well as in the durability thereof. Specifically, the electrode according to the present invention has the ability to generate hypochlorous acid with a concentration of 0.2 ppm or more, and this ability is maintained even after 500 hours of electric conduction.

Further, according to the electrode of the present invention, it is possible to efficiently generate hypochlorous acid water even for water with a relatively low concentration of a chloride ion, such as tap water. However, salt may be added to the water if desired, and such an embodiment is not excluded from the present invention.

When water is electrolyzed to generate hypochlorous acid, the operation of switching-over the polarity of the electrode is generally performed in order to suppress generation of deposits on the electrode surface. Although this operation can cause deterioration of the electrode, the electrode according to the present invention has the advantage that this can maintain its performance for a long period of time even under conditions of frequent polarity switching-over.

The electrode according to the present invention are typically usable at the current density with the order of magnitude in the range of 6 to 20 A/dm$^2$. In general, at a high current density, the production efficiency is increased, but the durability of the catalyst is decreased due to rapid consumption of the catalyst. However, the electrode according to the present invention is usable even under the condition of the high current density of 20 A/dm$^2$ as described above.

A specific use of the electrode according to the present invention may be for a hypochlorous acid production apparatus for a home use or a commercial use for sterilization. In addition, the electrode may be used as the electrode for generating hypochlorous acid water that is supplied to a toilet seat cleaning nozzle. Furthermore, the electrode may be preferably used for producing disinfected water in a kitchen and a bathroom vanity.

Method of Producing the Electrode

The electrode according to the present invention can be understood to have the composite layer having the composition in which rhodium is replaced by ruthenium and/or platinum in conventionally known rhodium-containing electrodes, as described above. Thus, the electrode can be conveniently produced by a method similar to that of the conventional electrodes, except that rhodium is replaced by ruthenium and/or platinum. Specifically, the electrode may be produced according to the method described in PTL 1 or 2.

A specific preferable method for forming the composite layer is as follows. Namely, precursors of iridium or its compound, of tantalum or its compound, of ruthenium or its compound, and of platinum, these constituting the composite layer, are applied to an electrode substrate, and then, these precursors are decomposed under an appropriate condition (e.g., thermal decomposition). In this way, they are converted to iridium or its compound, tantalum or its compound, ruthenium or its compound, and platinum, respectively, so that the composite layer can be formed.

Specific examples of the precursor of iridium and its compound include hydrogen hexachloroiridate, iridium chloride, iridium nitrate, and the like; among these, hydrogen hexachloroiridate is preferably used.

Also, tantalum chloride, tantalum ethoxide, and the like may be used as the precursor of tantalum or its compound; especially, tantalum ethoxide is preferably used.

Chloroplatinic acid, platinum chloride, and the like may be used as the precursor of platinum; especially, chloroplatinic acid is preferably used.

The precursors described above are dissolved or dispersed in a suitable solvent, applied to the electrode substrate, and dried; then, this is placed under the condition in which the precursors are converted to iridium or its compound, to tantalum or its compound, to ruthenium or its compound, and to platinum.

The precursors are dispersed or dissolved preferably in a lower alcohol (e.g., methanol, ethanol, propanol, butanol, etc. or mixtures thereof). Then, after drying in the temperature range of, for example, about 20° C. to about 150° C., they are fired in an oxygen-containing gas atmosphere, for example, in an air. Firing may be carried out by heating to a temperature range of generally about 450° C. to about 600° C., preferably about 500° C. to about 550° C., in a suitable heating furnace such as an electric furnace, a gas furnace, or an infrared furnace. The coating and firing processes described above may be repeated multiple times.

Examples

The present invention is further illustrated by the following Examples, but the present invention is not limited to these Examples.

By using the electrodes of Examples 1 to 8 and Comparative Example, tap water was electrolyzed at room temperature at 9.7 A/dm$^2$, and then the polarity thereof was switched over to perform electrolysis at −9.7 A/dm$^2$. This operation was repeated, and the hypochlorous acid concentration during electrolysis after the passage of certain time was measured by the DPD method; then, the electrolysis time was recorded when the concentration of hypochlorous acid generated by electrolysis became less than 0.2 ppm. The results are as described in Table 1 below.

TABLE 1

| | Blending ratio (mol %) | | | | | |
| --- | --- | --- | --- | --- | --- | --- |
| | Ir Iridium | Ta Tantalum | Rh Rhodium | Pt Platinum | Ru Ruthenium | Durability [hr] |
| Example 1 | 42.8 | 25.7 | 0 | 31.5 | 0 | 110.2 |
| Example 2 | 42.8 | 25.7 | 0 | 25 | 6.5 | 386.0 |
| Example 3 | 42.8 | 25.7 | 0 | 16.5 | 16 | 672.7 |
| Example 4 | 42.8 | 25.7 | 0 | 6.5 | 25 | 278.7 |
| Example 5 | 42.8 | 25.7 | 0 | 0 | 31.5 | 116.9 |
| Example 6 | 32.8 | 36.7 | 0 | 16.5 | 16 | 1178.8 |
| Example 7 | 42.8 | 35.7 | 0 | 11.5 | 10 | 398.1 |
| Example 8 | 32.8 | 25.7 | 0 | 21.5 | 20 | 413.4 |
| Comparative Example | 42.8 | 25.7 | 31.5 | 0 | 0 | 1143.8 |

Production of the Electrode
Preparation of the Substrate

A titanium plate material (t 0.5 mm×w 100 mm×l 100 mm) equivalent to JIS type 1 was washed with alcohol, then processed in an 8% by weight of hydrofluoric acid aqueous solution at 20° C. for 2 minutes, and then in a 60% by weight of sulfuric acid aqueous solution at 120° C. for 3 minutes. The titanium substrate was then taken out from the aqueous sulfuric acid solution, and then rapidly cooled by spraying with cold water. Further, this was immersed in a 0.3% by weight of hydrofluoric acid aqueous solution at 20° C. for 2 minutes, and then washed with water. After washing with water, this was heated in an air at 400° C. for 1 hour to form a thin intermediate layer of titanium oxide on the surface of the titanium substrate.

Formation of the Composite Layer

A solution containing precursors for forming the composite layer was prepared as follows. Namely, a butanol solution of ruthenium chloride adjusted to a ruthenium concentration of 100 g/L, a butanol solution of iridic acid chloride adjusted to a iridium concentration of 200 g/L, a butanol solution of tantalum ethoxide adjusted to a tantalum concentration of 200 g/L, and a butanol solution of chloroplatinic acid adjusted to a platinum concentration of 200 g/L each were weighed so that the composition ratio of Pt—Ir—Ru—Ta became to the percentage by mole described in Table 1 below; then, this was diluted with butanol so that the concentration of Ir in terms of metal became 50 g/L to obtain Examples 1 to 8 described in Table below. Also, a solution containing neither platinum nor ruthenium precursors but containing rhodium chloride instead of ruthenium chloride was prepared as Comparative Example.

Then, 0.27 ml of the resulting solution was weighed out with a pipette, applied to the intermediate layer of titanium oxide, dried at room temperature for 20 minutes, and then fired in an air at 550° C. for 10 minutes. This coating-drying-firing process was repeated six times to obtain an electrode having a platinum-iridium oxide-ruthenium oxide-tantalum oxide composite layer having the composition described in Table 1 below formed on the intermediate layer of titanium oxide.

What is claimed is:

1. An electrode to be used for generating hypochlorous acid by electrolyzing water that contains a chloride ion, comprising:
   an electrode substrate comprising titanium or titanium alloy,
   a composite layer that is electrically connected with the electrode substrate, and
   a thin intermediate layer comprising titanium oxide on a surface of the substrate;
   wherein the composite layer comprises iridium or a compound thereof, tantalum or a compound thereof, and ruthenium or a compound thereof and/or platinum, and does not contain rhodium oxide; and
   wherein the composite layer contains, in terms of metal, iridium in the range of 32 to 43 mol %, tantalum in the range of 25 to 36 mol %, ruthenium in the range of 8 to 22 mol %, and platinum in the range of 10 to 23 mol %.

2. The electrode according to claim 1, wherein the composite layer comprises iridium oxide, tantalum oxide, ruthenium oxide, and platinum.

3. The electrode according to claim 1, wherein the composite layer contains the ruthenium in the range of 11 to 19 mol % and the platinum in the range of 13 to 20 mol %.

4. The electrode according to claim 3, wherein a total of the ruthenium and the platinum, in terms of metal, is in the range of 24 to 39 mol %.

5. The electrode according to claim 1, wherein the water that contains a chloride ion is tap water or well water.

6. A hypochlorous acid water generating apparatus comprising the electrode according to claim 1.

7. A toilet apparatus comprising a hypochlorous acid water generating device that comprises the electrode according to claim 1.

8. A method for producing hypochlorous acid water, comprising the steps of:
   providing the electrode according to claim 1, and
   contacting the electrode with water that contains a chloride ion.

* * * * *